Figure 1:
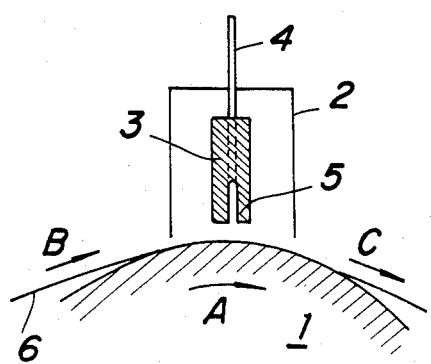

United States Patent [19]
>
> Isaka et al.

[11] Patent Number: 4,563,316

[45] Date of Patent: Jan. 7, 1986

[54] PRODUCTION OF POLYOLEFIN SHAPED PRODUCT

[75] Inventors: Tsutomu Isaka; Hiroshi Nagano, both of Inuyama, Japan

[73] Assignee: Toyo Boseki Kabushiki Kaisha, Osaka, Japan

[21] Appl. No.: 540,144

[22] Filed: Oct. 7, 1983

[30] Foreign Application Priority Data

Oct. 8, 1982 [JP] Japan .................... 57-178126
Jan. 26, 1983 [JP] Japan .................... 58-11912

[51] Int. Cl.$^4$ ............................... B29D 7/20
[52] U.S. Cl. ........................... 264/22; 264/85; 425/75; 425/174.8 E
[58] Field of Search ..................... 264/22, 85; 425/174.8 E, 75

[56] References Cited

U.S. PATENT DOCUMENTS

| | | | |
|---|---|---|---|
| 3,077,428 | 2/1963 | Heuser et al. | 264/85 |
| 3,255,099 | 6/1966 | Wolinski | 264/22 |
| 3,660,549 | 5/1972 | Hawkins | 264/22 |
| 3,686,374 | 8/1972 | Hawkins | 264/22 |
| 4,308,223 | 12/1981 | Stern | 264/22 |

FOREIGN PATENT DOCUMENTS

| | | | |
|---|---|---|---|
| 2160860 | 6/1972 | Fed. Rep. of Germany | 264/22 |
| 48-13712 | 4/1973 | Japan | 264/22 |
| 49-54471 | 5/1974 | Japan | 264/22 |
| 57-23634 | 2/1982 | Japan | 264/22 |

Primary Examiner—Jeffery Thurlow
Attorney, Agent, or Firm—Birch, Stewart, Kolasch & Birch

[57] ABSTRACT

A process for enhancing the adhesion of the surface of a polyolefin shaped product which comprises applying corona discharge the said surface under the continuous movement between an electrode for discharge and another electrode opposite thereto while jetting a gaseous material other than the air itself onto the part of the said surface to which corona discharge is applied so as to achieve the following relationships among the carbon atoms, the nitrogen atoms and the oxygen atoms present within 100 Å from the said surface:

(a) $-3.5 \leq ([O]/[C]-[O']/[C'])/([N]/[C]-[N']/[C']) \leq 1.8$ (b) $3.0 \leq [N']/[C']$ wherein [C], [N] and [O] are respectively the numbers of the carbon atoms, the nitrogen atoms and the oxygen atoms within 100 Å from the said surface before the application and [C'], [N'] and [O'] are respectively the numbers of the carbon atoms, the nitrogen atoms and the oxygen atoms within 100 Å from the said surface after the application, the number of the carbon atoms being always taken as 100.

2 Claims, 4 Drawing Figures

PRODUCTION OF POLYOLEFIN SHAPED PRODUCT

The present invention relates to production of a polyolefin shaped product. More particularly, the present invention relates to the production of a polyolefin shaped product improved in adhesion at a surface by the treatment of the surface with a corona discharge.

Treatment of shaped products made of plastic materials with corona discharge is well known. In particular, treatment of films of polyolefins (e.g. polyethylene, polypropylene) with corona discharge is important for modification of their surface characteristics such as improvement of their adhesive properties. Typical examples of corona discharge treatment for the improvement of adhesive properties are described in J. Applied Polymer Science, Vol. 15, 1365–1375 (1971), Japanese Patent Publn. (examined) No. 17747/1973, Japanese Patent Publn. (examined) No. 18381/1981, Japanese Patent Publn. (unexamined) No. 23634/1982, etc. However, the adhesive properties of polyolefin shaped products with various materials are still not satisfactory, particularly when corona discharge is applied to the shaped products under continuous movement.

As a result of an extensive study, it has been found that when corona discharge treatment is carried out so as to establish certain specific relationships among certain specific elements present within 100 Å from the surface of a polyolefin shaped product, the adhesive properties of the shaped product at the surface are markedly improved. It has also been found that for obtaining a polyolefin shaped product which satisfies such element relationships at the surface, corona discharge treatment is to be effected while jetting a gaseous material other than the air itself onto the part of the shaped product to which corona discharge is to be applied. The present invention is based on these findings.

According to the present invention, there is provided a process for enhancing the adhesion of the surface of a polyolefin shaped product which comprises applying corona discharge to the said surface under the continuous movement between an electrode for discharge and another electrode opposite thereto while jetting a gaseous material other than the air itself onto the part of the said surface to which corona discharge is applied so as to achieve the following relationships among the carbon atoms, the nitrogen atoms and the oxygen atoms present within 100 Å from the said surface:

(a) $-3.5 \leq ([O]/[C] - [O']/[C'])/([N]/[C] - [N']/[C']) \leq 1.8$ (b) $3.0 \leq [N']/[C']$ wherein [C], [N] and [O] are respectively the numbers of the carbon atoms, the nitrogen atoms and the oxygen atoms within 100 Å from the said surface before the application and [C'], [N'] and [O'] are respectively the numbers of the carbon atoms, the nitrogen atoms and the oxygen atoms within 100 Å from the said surface after the application, the number of the carbon atoms being always taken as 100.

As the polyolefin, there may be used any polymer of at least one olefin with or without any other copolymerizable monomer, the content of the olefin units being always not less than 50% by weight. Specific examples are polyethylene, polypropylene, polybutene-1, poly-4-methylpentene-1, polyhexene, polymers comprising propylene units in an amount of not less than 70% by weight, polymeric blends comprising propylene units in an amount of not less than 40% by weight, etc. When desired, these polyolefins may be incorporated with conventional additives insofar as any unfavorable influence onto the application of corona discharge is not produced. Examples of the additives are stabilizers, lubricants, anti-blocking agents, anti-corrosive agents, ultraviolet absorbers, fire retardants, clarifying agents, anti-oxidants, light-preventing agents, anti-static agents, dyestuffs, pigments, etc.

In order to prepare a shaped product with the polyolefin optionally comprising the additive(s), there may be adopted any conventional shaping procedure such as injection molding, extrusion molding, stretching, spinning, etc. Examples of the shaped product are films, sheets, filaments, pipes, tapes, fabrics, non-woven fabrics, etc.

For carrying out the process of this invention, a surface of the polyolefin shaped product under the continuous movement is subjected to treatment of corona discharge by passing the said surface between an electrode for discharge and another electrode opposite thereto while jetting a gaseous material other than the air itself onto the said surface. More specifically, the shaped product is passed through an apparatus for corona discharge having at least one pair of electrodes opposite to each other.

The gaseous material may consist of a single component or of two or more components. Examples of the gaseous material are nitrogen, hydrogen, argon, carbon dioxide, oxygen, ozone, xenon, krypton, etc. A modified air, i.e. the gaseous composition modified from the composition of the air itself, is also usable. Preferred is nitrogen or any gaseous composition comprising nitrogen except the air itself, particularly nitrogen or a modified air having a higher nitrogen content than the air. The jetting rate may be usually not less than 1% of the supply rate of the shaped product to the corona discharge apparatus, although this is not essential.

The conditions for corona discharge may be appropriately controlled so that the carbon atoms, the nitrogen atoms and the oxygen atoms present in the shaped product within 100 Å from the surface can satisfy the equations (a) and (b). The relationships of the equation (a) and of the equation (b) will be hereinafter referred to as "the element proportion" and as "the N/C ratio", respectively.

Taking a film uniaxially or biaxially stretched as an example of the shaped product and referring to the accompanying drawing, the present invention will be hereinafter explained in detail. However, it should be understood that the structure and arrangment of the electrodes for discharge, the shape of the electrode cover, etc. as shown in the accompanying drawing are merely typical embodiments of the invention and are not intended to limit the invention thereto.

Figure 2:
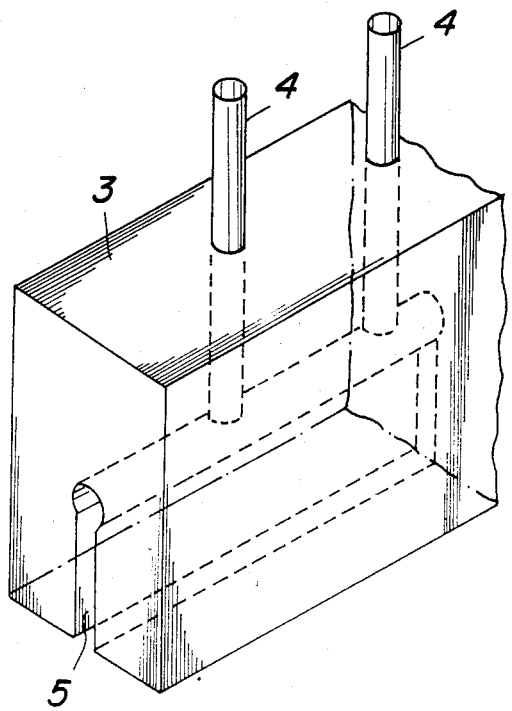
Figure 3:
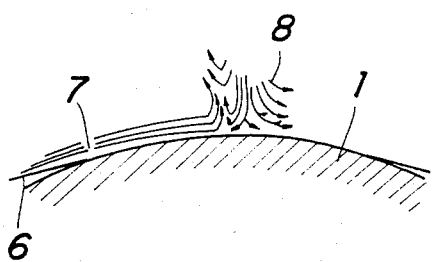
Figure 4:
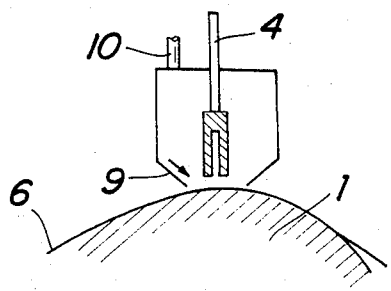

In the accompanying drawing,

FIG. 1 is the sectional view showing the outline of the process of the invention, FIG. 2 is the perspective view showing a part of the electrode for discharge usable in the process of the invention, FIG. 3 is the sectional view showing the state of break and elimination of the accompanying air layer at the surface of a film and FIG. 4 is the sectional view showing an embodiment of the electrode cover.

In these Figures, (1) is a metal drum, (2) is an electrode cover, (3) is a discharge electrode, (4) is a gas supply pipe, (5) is a gas jet nozzle and (6) a running film. The film (6) is introduced along the arrow line B onto the metal drum (1), which rotates in the direction of the arrow line A, and taken out towards the arrow line C. Between the discharge electrode (3) connected to a high voltage generator (not shown) and the metal drum (1) covered by a polymeric material (e.g. a polyester resin, an epoxy resin, a ceramic, a chlorosulfonated polyethylene or an ethylenepropylene rubber), a high voltage such as several thousands to several ten thousands V is applied with a high frequency such as several hundreds KC/S so that a high voltage corona is produced. By the effect of the corona discharge, the film (6) passing through between the metal drum (1) and the discharge electrode (3) is activated at the surface; this is probably due to the formation of such active groups as carbonyl groups, carboxyl groups, imino groups and amino groups at the surface of the film (6).

In the conventional procedure, the air accompanied with or carried on the film (6) oxidizes the surface of the film and deteriorates the adhesion at the surface. In the present embodiment of the invention, the gas jet nozzle (5) is provided on the discharge electrode (3) so as to jet the gaseous material onto the surface of the film (6). Further, the entire atmosphere for corona discharge is shielded from the atmospheric air by the aid of the electrode cover (2). Due to these constructions, the said deterioration is prevented, and the corona discharge effect on the surface of the film (6) can be fully exerted.

The film (6) running along the arrow line B with a high speed carries more or less the air on the surface. Such air will be hereinafter referred to as "accompanying air". Because of this reason, the surface of the film (6) remains covered with the air even after the atmosphere in which corona discharge is effected is replaced by the gaseous material. When the gaseous material is strongly jetted onto the surface of the film (6) (FIG. 3), the layer of accompanying air (7) is broken and eliminated by the jet stream (8), and the atmosphere on the surface of the film is almost perfectly replaced by the gaseous material. The rate of the jet stream (8) required for break and elimination of the layer of accompanying air (7) depends upon various factors and is not limitative. Usually, however, it may be decided on the rate of the layer of accompanying air (7), i.e. the running rate of the film (6). Namely, the rate of the jet stream of the gaseous material may be adjusted to not less than 1%, preferably not less than 10%, more preferably not less than 40% of the running rate of the film (6), which may be usualy from 1 to 500 m/min, coming into the corona discharge apparatus. By the above operation, the layer of accompanying air is broken and eliminated. Simultaneously, the part to which corona discharge is to be applied and its neighbouring part are protected by the gaseous material.

The use of the electrode cover (2) as shown in FIG. 1 is not essential but preferable, because it is effective for protecting the electrode (3) from any mechanical impact, decreasing the accompanying air and retaining the desirable atmosphere. The electrode cover (2) may be shaped in any special structure as as to enhance its atmosphere retaining function. For instance, as shown in FIG. 4, the electrode cover (2) may be narrowed at the lower portion, and simultaneously the gaseous material is introduced from the pipe (10) into the electrode cover (2) so that the gaseous material flows down along the inside wall of the inclined surface to exert a gas curtain effect at the entrance of the electrode cover (2). At the discharge side, the gaseous material in the electrode cover (2) goes out with the running film (6), and such high regard as required at the entrance side is not needed. In order to save the consumption of the gaseous material, however, the same regard at the entrance may be made also at the discharge side. Alternatively, for instance, the electrode cover (2) may be so constructed as having itself a passage for the gaseous material, which is jetted at the lower or lowest edge of the entrance side towards the surface of the running film, preferably counter-currently. When desired, an additional passage may be provided in the electrode cover (2) itself so as to carry out jetting at the edge of the discharge side. For exertion of the shield effect, the jetting rate of the gaseous material is desired to be kept at not less than 0.2%, preferably not less than 10%, of the running rate of the film. Any material limitation is not present on the upper jetting rate and may be decided on the economy and the quality of the final product.

The effect of corona discharge is much increased when the application is made under the conditions as set forth above, and the adhesive properties with various materials such as metals, printing inks, resins, etc. are much improved.

Practical and presently preferred embodiments of this invention are illustratively shown in the following Examples.

In these Examples, measurement of the physical properties was made in the following manner:

(1) Haze:

Measured by the process as described in JIS (Japanese Industrial Standards) K-6714.

(2) Printing ink adhesiveness:

Printing of a test film with red color and white color was carried out by the aid of a gravure printing machine using commercially available printing inks for cellophane. After printing, the printed material was dried by a conventional procedure and subjected to peel test (using a commercially available cellophane tape), rubbing test and scratch test. The evaluation was made in the following criteria:

(a) Peel test
5: no peeling
4: peeling area, less than 5%
3: peeling area, 5 to less than 10%
2: peeling area, 10 to less than 50%
1: peeling area, 50% or more (b) Rubbing test (5 rubbing at the same place and ink elimination observed by naked eye)
5: no elimination
4: slight elimination in line; no practical problem
3: elimination at several parts in wrinkled lines
2: elimination at many parts in wrinkled lines
1: elimination a many parts not only in lines but also with widths (c) Scratch test
The printed portion of the printing material placed on a hard paper was scratched, and ink elimination was examined.

(3) Laminate strength:

A test film was printed with a cellophane ink, a polyethylene imine was coated thereon and, after drying, polyethylene of low density was laminated thereon at 290° C. by the melt extrusion procedure to make a laminated layer of 30 μm in thickness. After ageing for 24 hours, the film and the laminated layer were separated from each other under the conditions of a peeling angle of 180° and a peeling rate of 200 mm/min. The adhesive strength on the separation was measured.

(4) Other adhesion:

The adhesion with the deposited layer of aluminum as well as the adhesion with a vinylidene chloride resin was examined in the same manner as in (2).

(5) Determination of element ratios by the ESCA method:

Using an ESCA spectrometer (Model ES-200; manufactured by Kokusai Denki K.K.), the ratio of the integrated intensity obtained from the 1st orbit spectrum of the carbon atom at the surface of a test film and the integrated intensity obtained from the peak corresponding to the bonding energy of the organic nitrogen atom in the 1st orbit spectrum was calculated, and on the basis of the thus calculated ratio, the number of the nitrogen atoms per 100 carbon atoms (i.e. [N]/[C] before application of corona discharge and [N']/[C'] after application of corona discharge) was determined. Likewise, [O]/[C] (the number of the oxygen atoms per 100 carbon atoms before application of corona discharge) and [O']/[C'] (the number of the oxygen atoms per 100 carbon atoms after application of corona discharge) were determined.

EXAMPLE 1

Using isotactic polypropylene (melt index, 4.0), there was prepared a biaxially stretched film of 20 μm in thickness according to a conventional procedure. This film was employed as a test film.

The test film running at a rate of 20 m/min was subjected to corona discharge while jetting a nitrogen gas containing oxygen as shown in Table 1 onto its surface. Electric power for treatment was 4,000 J/m².

For comparison, the test film was also subjected to corona discharge in the air or in the nitrogen gas without jetting.

The results are shown in Table 1.

TABLE 1

| Run No. | Atmosphere (O₂ % by volume; remaining, N₂) | Jetting rate (m/sec) | Remarks |
| --- | --- | --- | --- |
| 1 | Air | 0 | Comparative |
| 2 | 1.0 | 0 | " |
| 3 | 0.1 | 0 | " |
| 4 | 0.005 | 0 | " |
| 5 | 1.0 | 2 | Invention |

TABLE 1-continued

| Run No. | Atmosphere (O₂ % by volume; remaining, N₂) | Jetting rate (m/sec) | Remarks |
| --- | --- | --- | --- |
| 6 | 0.1 | 2 | " |

With respect to each of the test films as above, the [O]/[C] value, the [O']/[C'] value, the [N]/[C] value and the [N']/[C'] value as well as the adhesion properties were measured, and the results are shown in Table 2.

Further, the test film was subjected to printing, and then polyethylene was laminated thereon, followed by pressing with a hot plate of 130° C. for 2 seconds. The adhesive strength of the laminate was examined, and the results are shown in Table 3.

TABLE 2

| | ESCA analysis | | | | | | Adhesion | | | | | |
| | Before corona discharge | | After corona discharge | | | | Printing ink | | | Polyethylene laminate | Aluminum | Polyvinylidene chloride | |
| Run No. | [O]/[C] | [N]/[C] | [O']/[C'] | [N']/[C'] | [O]/[C] − [O']/[C'] [N]/[C] − [N']/[C'] | Haze (%) | Peel | Rubbing | Scratch | (printed part) (g/15 mm) | deposition | film | Remarks |
| 1 | 0.6 | 0.3 | 16.1 | 0.8 | 31.0 | 2.1 | 1 | 1 | 1 | 10 | 1 | 1 | Comparative |
| 2 | 0.7 | 0.6 | 17.6 | 2.4 | 9.4 | 2.1 | 2 | 2 | 3 | 22 | 2 | 1 | Comparative |
| 3 | 0.7 | 0.6 | 17.7 | 3.2 | 6.5 | 2.2 | 3 | 4 | 4 | 35 | 3 | 2 | Comparative |
| 4 | 0.7 | 0.6 | 18.2 | 3.1 | 7.0 | 2.2 | 4 | 5 | 5 | 105 | 4 | 4 | Comparative |
| 5 | 0.6 | 0.5 | 6.8 | 4.8 | 1.4 | 2.1 | 5 | 5 | 5 | 182 | 5 | 4 | Invention |
| 6 | 0.6 | 0.5 | 4.5 | 5.0 | 0.87 | 2.2 | 5 | 5 | 5 | 242 | 5 | 5 | Invention |

TABLE 3

| | Polyethylene laminate adhesion (g/15 mm) | | |
| Run No. | Non-printed part | Printed part | Remarks |
| --- | --- | --- | --- |
| 1 | 10 | 5 | Comparative |
| 2 | 13 | 7 | " |
| 3 | 31 | 20 | " |
| 4 | 60 | 42 | " |
| 5 | 210 | 165 | Invention |
| 6 | 265 | 233 | " |

As seen in Tables 1 to 3, the element proportion can not be suppressed at a low level and the adhesion is insufficient, when the corona discharge is carried out in the air (Run No. 1) or in the atmosphere of nitrogen gas containing oxygen without jetting (Run Nos. 2, 3 and 4). In Run Nos. 3 and 4, the N/C ratio meets the requirement but the element proportion is much larger than the required upper limit so that a sufficient adhesion is not obtained. When the nitrogen gas containing oxygen at the same level as above is jetted to the surface to be subjected to corona discharge (Run Nos. 5 and 6), not only the N/C ratio but also the element proportion are satisfactory, and an excellent adhesion can be assured. It is thus understood that not only the control of the oxygen concentration in the entire atmosphere wherein corona discharge is carried out but also the jetting of the gaseous materaial into the surface to be subjected to corona discharge so as to break the layer of accompanying air and reduce the oxygen concentration at the said surface are essential.

The film in Run No. 4 appears to be practically usable. However, the adhesion is relatively low. In addition, it was confirmed that the adhesion onto cellophane is extremely lowered by heat treatment.

EXAMPLE 2

A biaxially stretched polypropylene film ("Pyren" film-OT, P-2061; manufactured by Toyobo Co., Ltd.; 20 μm) as the test film was subjected to corona discharge under the conditions as shown in Table 4.

In Run Nos. 7 to 12, the amount of the nitrogen gas was kept at a rate of 8 m$^3$/hr per 1 m of the width of the test film, and in Run Nos. 10 to 12, the gas jetting rate was kept at 1.8 m/sec. In Run Nos. 13 to 16, the gas supply was changed so as to control the oxygen concentration at the surface on the side of discharge of the film. In case of the gas being merely introduced into the corona discharge apparatus (Run Nos. 13 and 14), the gas in an amount of 3 to 8 times that in case of jetting (Run Nos. 15 and 16) was needed to attain a nearly equal oxygen level.

The adhesive properties of the test films as obtained are shown in Table 5.

nying air so that the treatment efficiency is enhanced, the element proportion is kept at a low level, and the adhesion to various materials is extremely enhanced.

EXAMPLE 3

Into isotactic polypropylene, there were incorporated polyoxyethylene stearate (average degree of polymerization at the polyoxyethylene portion=20) and stearic acid monoglyceride respectively in amounts of 0.4% by weight and 0.2% by weight based on the total weight of the resulting composition to obtain a resin composition for film preparation. The resin composition was biaxially stretched according to a conventional procedure to make a test film of 25 μm in thickness.

The test film was subjected to corona discharge while jetting a nitrogen gas containing oxygen in an amount of 0.0008% by volume thereto at a rate of 5 m/sec. The used electric power was 4800 J/m$^2$, the treatment speed was 20 m/min, and the oxygen concentration in the atmosphere for treatment was 0.008% by volume.

For comparison, the test film was subjected to corona discharge in the atmosphere wherein the nitrogen gas was simply introduced therein.

TABLE 4

| Run No. | Corona discharge Speed (m/min) | Corona discharge Electric power (joule/m) | O$_2$ concentration in nitrogen (% by volume) | ESCA analysis Before corona discharge [O]/[C] | ESCA analysis Before corona discharge [N]/[C] | ESCA analysis After corona discharge [O']/[C'] | ESCA analysis After corona discharge [N']/[C'] | [O]/[C] − [O']/[C'] [N]/[C] − [N']/[C'] | Remarks |
|---|---|---|---|---|---|---|---|---|---|
| 7 | 20 | 4000 | 0.03 | 7.1 | 2.0 | 12.6 | 3.2 | 4.58 | Comparative |
| 8 | 60 | 4015 | 0.7 | 7.2 | 2.0 | 12.8 | 2.6 | 9.33 | " |
| 9 | 100 | 4008 | 5.2 | 7.2 | 2.0 | 14.1 | 2.1 | 69 | " |
| 10 | 20 | 3995 | 0.01 | 7.2 | 2.0 | 9.1 | 5.5 | 0.54 | Invention |
| 11 | 60 | 4010 | 0.21 | 7.2 | 2.0 | 9.7 | 5.4 | 0.74 | " |
| 12 | 100 | 4000 | 3.1 | 7.2 | 2.0 | 11.2 | 4.6 | 1.54 | " |
| 13 | 60 | 4000 | 0.05 | 7.1 | 2.0 | 12.3 | 2.9 | 5.78 | Comparative |
| 14 | 100 | 4000 | 0.06 | 7.1 | 2.0 | 13.5 | 2.4 | 16 | " |
| 15 | 60 | 4000 | 0.05 | 7.1 | 2.0 | 9.3 | 5.3 | 0.67 | Invention |
| 16 | 100 | 4000 | 0.06 | 7.1 | 2.0 | 9.7 | 4.5 | 1.04 | " |

TABLE 5

| Run No. | Haze (%) | Adhesion Printing ink Peel | Adhesion Printing ink Rubbing | Adhesion Printing ink Scratch | Polyethylene laminate (printed part) (g/15 mm) | Aluminum deposition | Polyvinylidene chloride film | Remarks |
|---|---|---|---|---|---|---|---|---|
| 7 | 2.0 | 4 | 4 | 4 | 118 | 4 | 3.5 | Comparative |
| 8 | 1.8 | 2 | 3 | 2 | 86 | 2 | 2 | Comparative |
| 9 | 1.8 | 1 | 2 | 1 | 16 | 1 | 1 | Comparative |
| 10 | 1.9 | 5 | 5 | 5 | 287 | 5 | 5 | Invention |
| 11 | 1.8 | 5 | 5 | 5 | 238 | 5 | 5 | " |
| 12 | 1.8 | 4.5 | 5 | 4.5 | 225 | 4.5 | 4.5 | " |
| 13 | 1.8 | 4 | 5 | 4 | 99 | 3 | 3 | Comparative |
| 14 | 1.8 | 3 | 3 | 2 | 67 | 2 | 2 | Comparative |
| 15 | 1.8 | 5 | 5 | 5 | 251 | 5 | 5 | Invention |
| 16 | 1.8 | 5 | 5 | 5 | 239 | 5 | 4.5 | " |

As seen in Tables 4 and 5, the mere introduction of the gaseous material into the apparatus for corona discharge (Run Nos. 7 to 9, 13 and 14) can not eliminate the layer of accompanying air on the surface of the film. As the result, the treatment efficiency is lowered, the element proportion is not kept at a low level, and the adhesion is not sufficiently high. Jetting of the gaseous material onto the surface of the film (Run Nos. 10 to 12, 15 and 16) breaks and eliminates the layer of accompa- The adhesive properties of the treated films are shown in Table 6.

EXAMPLE 4

Into itotactic polypropylene, sorbitan oleate was incorporated in an amount of 0.4% by weight based on the total weight of the resulting composition. The thus obtained resin composition was biaxially stretched according to a conventional procedure to make a test film of 25 μm in thickness.

The test film was subjected to corona discharge under the same conditions as in Example 3 but adjusting the jetting rate to 10 m/sec.

The adhesive properties of the treated film are shown in Table 6.

rona discharge is being applied so as to achieve the following relationships among the carbon atoms, the nitrogen atoms and the oxygen atoms present within 100 Å from the said surface:

(a) $-3.5 \leq ([O]/[C] - [O']/[C'])/([N]/[C] - [N']/[C']) \leq 1.8$ (b) $3.0 \leq [N']/[C']$

TABLE 6

| | ESCA analysis | | | | | | Adhesion | | | |
| | Before corona discharge | | After corona discharge | | | | | Polyethylene laminate (printed part) (g/15 mm) | Aluminum deposition | Polyvinylidene chloride film | |
| Run No. | [O]/[C] | [N]/[C] | [O']/[C'] | [N']/[C'] | $\frac{[O]/[C] - [O']/[C']}{[N]/[C] - [N']/[C']}$ | Haze (%) | Peel of printing ink | | | | Remarks |
|---|---|---|---|---|---|---|---|---|---|---|---|
| 17 | 1.2 | 0.9 | 1.0 | 6.3 | −0.04 | 2.4 | 5 | 230 | 5 | 5 | Invention |
| 18 | 1.5 | 1.2 | 0.08 | 5.8 | −0.31 | 2.3 | 5 | 280 | 5 | 5 | Invention |
| 19 | 1.2 | 0.9 | 15.1 | 3.1 | 6.3 | 2.5 | 4 | 90 | 3 | 2 | Comparative |

As seen in Table 6, the embodiments of the invention achieve a high adhesion even when the film comprises an organic additive(s) in addition to the polyolefin.

What is claimed is:

1. A process for enhancing the adhesion property of the surface of a polyolefin shaped product which comprises applying corona discharge to said polyolefin surface as it continuously moves between a discharge electrode and another electrode disposed opposite thereto while jetting a gaseous material, other than air itself, onto that portion of the said surface to which the corona discharge is being applied so as to achieve the following relationships among the carbon atoms, the nitrogen atoms and the oxygen atoms present within 100 Å from the said surface:

wherein [C], [N] and [O] are respectively the numbers of the carbon atoms, the nitrogen atoms and the oxygen atoms within 100 Å from said surface before the application and [C'], [N'] and [O'] are respectively the numbers of the carbon atoms, the nitrogen atoms and the oxygen atoms within 100 Å from said surface after the application, the number of the carbon atoms being always taken as 100.

2. The process of claim 1 wherein the gaseous material is nitrogen.

* * * * *